United States Patent [19]

Hibi

[11] Patent Number: 5,144,850
[45] Date of Patent: Sep. 8, 1992

[54] CONTINUOUSLY VARIABLE TRACTION ROLLER TRANSMISSION

[75] Inventor: Toshifumi Hibi, Kanagawa, Japan

[73] Assignee: Nissan Motor Co., Ltd., Yokohama, Japan

[21] Appl. No.: 722,251

[22] Filed: Jun. 27, 1991

[30] Foreign Application Priority Data

Jul. 10, 1990 [JP] Japan .................. 2-180576

[51] Int. Cl.⁵ .............................. F16H 15/08
[52] U.S. Cl. ........................ 74/200; 74/196
[58] Field of Search ........ 74/201, 200, 194, 196; 475/114, 115, 186, 185, 190, 192, 330

[56] References Cited

U.S. PATENT DOCUMENTS

| | | | |
|---|---|---|---|
| 3,430,504 | 3/1969 | Dickenbrock | 74/200 |
| 4,229,986 | 10/1980 | Sharpe | 74/200 |
| 4,272,999 | 6/1981 | Perry | 74/200 |
| 4,928,542 | 5/1990 | Nakano | 74/201 X |
| 4,934,206 | 6/1990 | Nakano | 74/200 |
| 5,027,668 | 7/1991 | Nakano | 74/200 |
| 5,027,669 | 7/1991 | Nakano | 74/200 |

FOREIGN PATENT DOCUMENTS

| | | | |
|---|---|---|---|
| 0378813 | 7/1990 | European Pat. Off. | |
| 63-130953 | 6/1988 | Japan . | |
| 229158 | 9/1989 | Japan | 74/200 |
| 2018894 | 10/1979 | United Kingdom . | |

Primary Examiner—Richard Lorence
Assistant Examiner—Khoi Q. Ta
Attorney, Agent, or Firm—Foley & Lardner

[57] ABSTRACT

A continuously variable traction roller transmission comprises a loading nut having one end portion which abuts on a stopper formed by one end face of a ball spline, disc springs arranged between an input disc and the loading nut, and a preliminary pressure adjusting member arranged between the input disc and the disc springs.

8 Claims, 2 Drawing Sheets

CONTINUOUSLY VARIABLE TRACTION ROLLER TRANSMISSION

BACKGROUND OF THE INVENTION

The present invention relates to a continuously variable traction roller transmission.

One of the previously proposed continuously variable traction roller transmissions is disclosed, for example, JP-A 63-130953 published on Jun. 3, 1988. This known continuously variable traction roller transmission includes a continuously variable transmission unit having an input disc, an output disc, and a pair of traction rollers which come in frictional contact with the two, and performs control of a gear ratio by altering a contact state between the two discs and the traction rollers. A predetermined frictional force should be applied between the two discs and the traction rollers so as to allow transmission of torque therebetween. For that purpose, a pressing force is applied between the two discs and the traction rollers, and in an axial direction of a rotation shaft of the two discs. This pressing force is provided by a loading cam or cam roller which produces thrust in response to input torque. It is to be noted that since the pressing force of the loading cam is scarcely produced when input torque is in the vicinity of zero, a preload of the disc springs is in operation as an initial pressing force. That is, the disc springs are compressed to have a predetermined amount of deformation, thereby obtaining an elastic force which is applied to the two discs and the traction rollers. Compression of the disc springs is made by a loading nut screwed to the rotation shaft. An amount of screwing of the loading nut is adjusted to set constant the preload provided by the disc springs. This adjustment is carried out by setting an axial clearance between the loading nut and a disc member which is arranged opposite to the side of the loading nut through the disc springs. That is, the loading nut is screwed until the clearance between the disc member and the loading nut comes to a predetermined value.

However, with such known continuously variable traction roller transmission, one problem is that the operation for adjusting and screwing the loading nut at the same time to obtain a predetermined clearance between the disc member and the loading nut is difficult to carry out and takes much time. Another problem is that a preload of the disc springs is difficult to set to a constant value due to variations susceptible to produce in adjusting operation.

The preload of the disc springs may be used in screwing the loading nut to come in contact with the disc member, viz., in a state where the disc springs have no margin of deformation. In that event, however, there arises the other problem that the pressing force exceeds a required level.

Referring to FIG. 2, a minimum pressing force required to transmit torque is indicated by a two-dotted chain line, where input torque is taken on the horizontal axis, and pressing force is taken on the vertical axis. If the pressing force is above the two-dotted chain line, torque can be transmitted, whereas, if it is below the two-dotted chain line, slippage can occur. A pressing force as obtained by the disc springs and the loading cam is indicated by a fully drawn line in FIG. 2. Specifically, when input torque is null, a load $f_0$ as provided by the disc springs is in operation. As input torque increases gradually, the disc springs begin to be compressed with a force scarcely changed from $f_0$. When the disc springs are compressed until there is any clearance between the loading nut and the disc member, a pressing force of the loading cam begins to operate due to the disc springs being incapable of further compression. Thus, a characteristic of pressing force as indicated by the fully drawn line in FIG. 2 is obtained. On the other hand, when no clearance is established between the loading nut and the disc member in screwing the loading nut to come in contact with the disc member from the beginning, viz., when the disc springs have no margin of deformation, a characteristic of pressing force as indicated by a broken line in FIG. 2 is obtained: When input torque begins to increase from zero, the pressing force of the loading cam becomes effective immediately due to the disc springs being incapable of further deformation at that moment. Of course, the pressing force as indicated by the broken line in FIG. 2 permits torque transmission, but it exceeds a required level. This results in inconveniences such as a decrease in durability of components, a decrease in transmission efficiency due to increased frictional resistance, etc.

Therefore, an object of the present invention is to provide a continuously variable traction roller transmission in which a preload as provided by discs springs can be set to a predetermined value with easy adjusting operation.

SUMMARY OF THE INVENTION

According to one aspect of the present invention, there is provided a continuously variable traction roller transmission having first and second discs, the first disc being supported on a rotation shaft through a ball spline, and a pair of traction rollers which come in frictional contact with the first and second discs, comprising a loading nut secured to the rotation shaft, said loading nut having one end portion which abuts on the ball spline at one end face thereof; spring means for urging the first disc to the second disc, said spring means being arranged between the first disc and said loading nut so as to have a predetermined margin of deformation; and a preloader arranged in series with said spring means in an axial direction of the rotation shaft, said preloader being arranged between the first disc and said spring means.

According to another aspect of the present invention, there is provided a continuously variable traction roller transmission having first and second continuously variable transmission units, each including input and output discs, the input disc being supported on a rotation shaft through a ball spline, and a pair of traction rollers which come in frictional contact with the input and output discs, comprising a loading nut secured to the rotation shaft, said loading nut having one end portion which abuts on the ball spline of the second continuously variable transmission unit at one end face thereof; spring means for urging the input disc of the second continuously variable traction unit to the output disc thereof, said spring means being arranged between the input disc of the second continuously variable transmission unit and said loading nut so as to have a predetermined deformation; and a preloader arranged in series with said spring means, said preloader being arranged between the input disc of the second continuously variable transmission unit and said spring means.

According to still another aspect of the present invention, there is provided a continuously variable traction roller transmission having first and second discs, and a pair of traction rollers which come in frictional contact therewith, comprising a rotation shaft; a ball spline arranged on said rotation shaft for supporting the first disc, said ball spline having one end face; a loading nut secured to said rotation shaft, said loading nut having one end portion which abuts on said one end face of said ball spline; spring means for urging the first disc to the second disc, said spring means being arranged between the first disc and said loading nut; and a preloader arranged in series with said spring means in an axial direction of the rotation shaft, said preloader being arranged between the first disc and said spring means.

According to further aspect of the present invention, there is provided a continuously variable traction roller transmission having first and second continuously variable transmission units, each including input and output discs and a pair of traction rollers which come in frictional contact therewith, comprising a rotation shaft; a ball spline arranged on said rotation shaft for supporting the input disc of the second continuously variable transmission unit, said ball spline having one end face; a loading nut secured to said rotation shaft, said loading nut having one end portion which abuts on said one end face of said ball spline; spring means for urging the input disc of the second continuously variable transmission unit to the output disc thereof, said spring means being arranged between the input disc of the second continuously variable transmission unit and said loading nut so as to have a set margin of deformation; and a preloader arranged in series with said spring means, said preloader being arranged between the input disc of the second continuously variable transmission unit and said spring means.

DETAILED DESCRIPTION OF THE INVENTION

Figure 1:
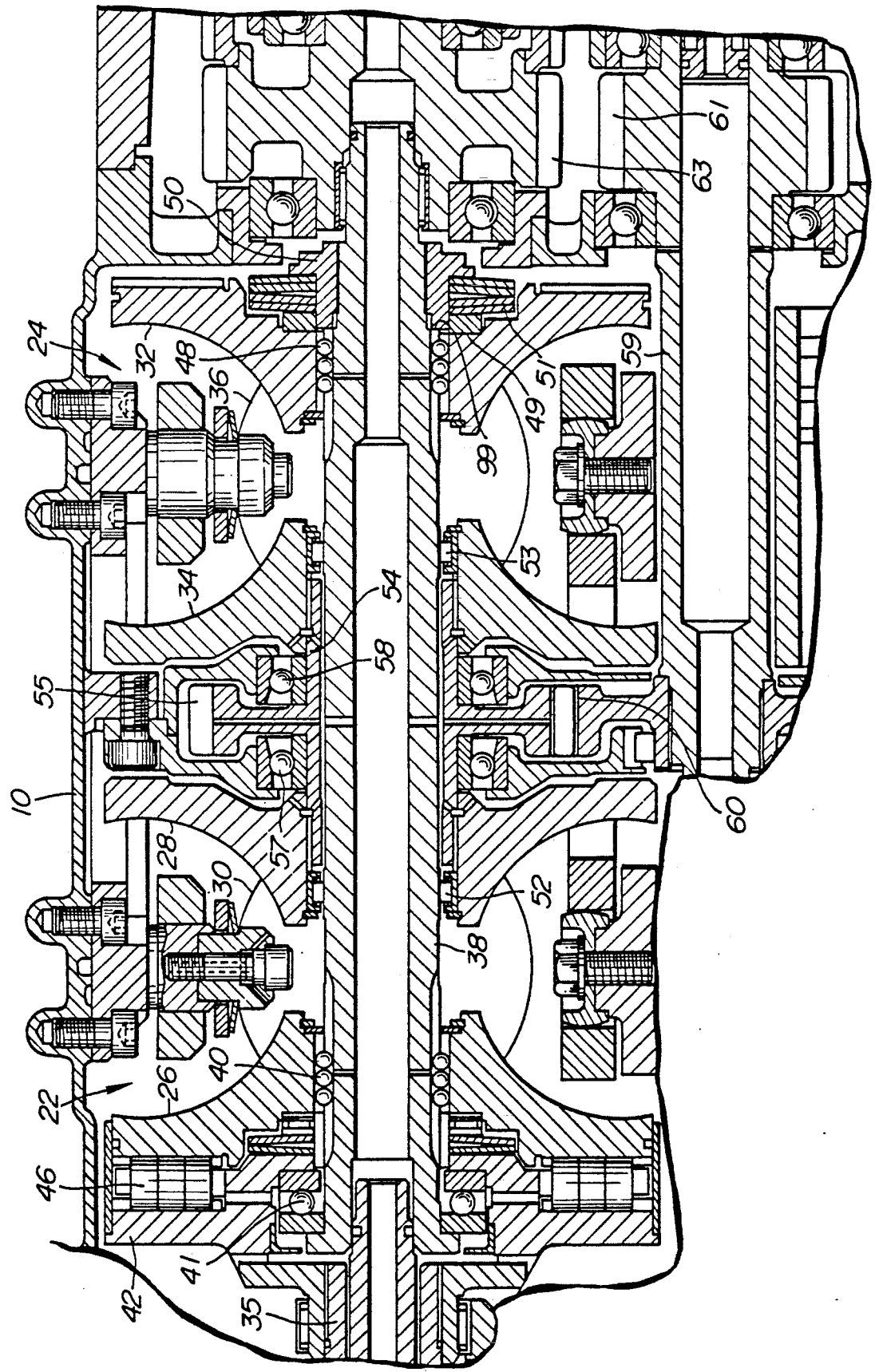
FIG. 1 is a longitudinal section illustrating a preferred embodiment of a continuously variable traction roller transmission according to the present invention.

Referring to FIG. 1, a continuously variable traction roller transmission includes first and second continuously variable transmission units 22 and 24 within a chamber defined by a casing 10. The first continuously variable transmission unit 22 includes an input disc 26, an output disc 28, and a pair of traction rollers 30 for transmitting torque between the two. A contact surface of each of the input disc 26 and the output disc 28 with the traction rollers 30 is shaped in a toroid. A rotational speed ratio of the input disc 26 to the output disc 28 can continuously be changed by altering a contact state of the traction rollers 30 with the input disc 26, and the output disc 28. The second continuously variable transmission unit 24 includes an input disc 32, an output disc 34, and a pair of traction rollers 36 the same as the first continuously variable transmission unit 22. It is to be noted that the input and output discs 32 and 34 of the second continuously variable transmission unit 24 are disposed in an opposite manner to the input and output discs 26 and 28 of the first continuously variable transmission unit 22. That is, the output disc 28 and the output disc 34 are arranged to be adjacent to each other. The input disc 26 of the first continuously variable transmission unit 22 is supported to a rotation shaft 38 at the outer periphery thereof through a ball spline 40. A cam flange 42 is disposed on the reverse side of the input disc 26 so as to perform unitary rotation with an input shaft 35 to which engine torque is inputted through a torque converter (not shown). An axial position of the cam flange 42 is defined with respect to the rotation shaft 38 through a thrust bearing 41. A cam roller 46 is arranged between two cam surfaces of the cam flange 42 and the input disc 26 which face each other. The cam roller 46 has a shape to produce a force to urge the input disc 26 to the output disc 28 when relative rotation occurs between the input disc 26 and the cam flange 42. Similarly, the input disc 32 of the second continuously variable transmission unit 24 is operatively connected to the rotation shaft 38 through a ball spline 48. The input disc 32 undergoes a force in the direction of the output disc 34 out of four disc springs 51 which in turn undergo a compression out of a loading nut 50 screwed to the rotation shaft 38. A disc preloader 49 which will be described hereinafter is disposed between the disc springs 51 and the input disc 32. The loading nut 50 is so screwed as to abut on a stopper 99 formed by one end face of the ball spline 48. In that event, the disc springs 51 have a set margin of deformation which is variable in response to input torque. The output disc 28 of the first continuously variable transmission unit 22 is rotatably supported on the rotation shaft 38 through a needle bearing 52. Similarly, the output disc 34 of the second continuously variable transmission unit 24 is rotatably supported on the rotation shaft 38 through a needle bearing 53. A sleeve 54 is arranged between the output disc 28 and the output disc 34, and splined therewith. The sleeve 54 is supported on a member integrally formed with the casing 10 through two angular ball bearings 57 and 58. A driving gear 55 is integrally formed with the sleeve 54, and engaged with a follower 60 to perform unitary rotation. The follower 60 is operatively connected by a spline to one end of a countershaft 59 arranged in parallel with the rotation shaft 38. A gear 61 as integrally formed with the other end of the countershaft 59 can transmit torque to an output gear 63 through an idle gear (not shown).

Figure 2:
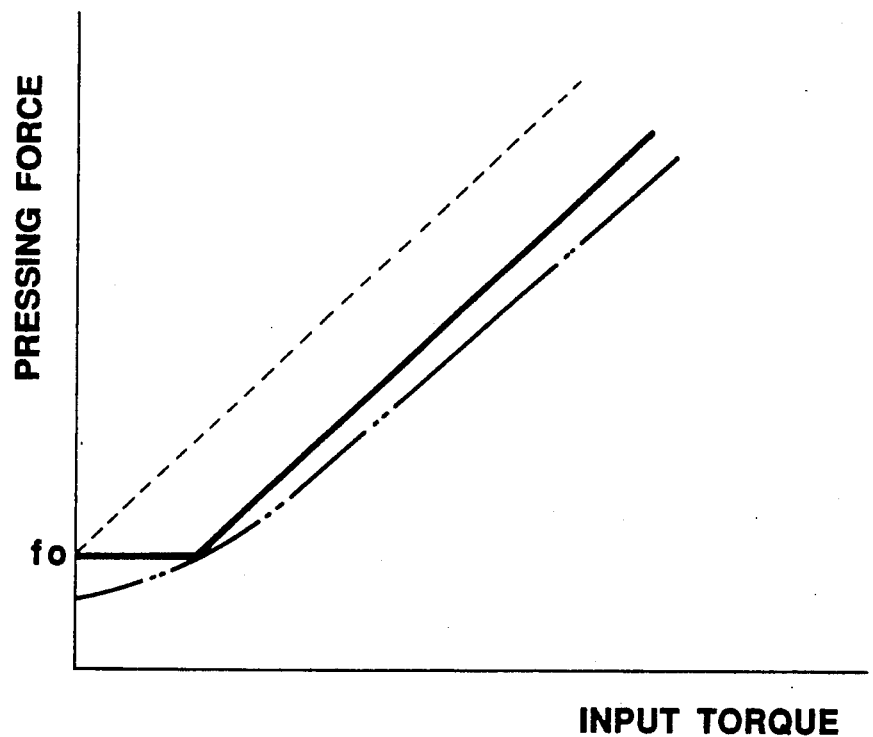
FIG. 2 is a graphical representation illustrating a characteristic of a pressing force vs. input torque.

When assembling, the first and second continuously variable transmission units 22 and 24 are mounted to the rotation shaft 38 one after another, and finally restricted in an axial direction thereof by the loading nut 50. In that event, the loading nut 50 is so screwed as to abut on the stopper 99 of the rotation shaft 38. A thickness and a dimension of the disc preloader 49 are previously selected based on a thickness, a spring constant of the disc springs 51, etc. so that, on that condition, the disc springs 51 are in a state of compression with an amount of deflective deformation required to obtain a set preload, and with a predetermined margin of deformation. Thus, the preload can be set to a predetermined value only by screwing the loading nut 50 up to a stop position. When input torque operates out of the input shaft 35, the rotation shaft 38 and the loading nut 50 are movable to the left as viewed in FIG. 1 until the disc springs 51 are in a state of close contact. During a transition period, the disc springs 51 provide almost a constant pressing force ($=f_0$ in FIG. 2), whereas, after the disc springs 51 are in a state of close contact, the cam roller 46 provides a pressing force. Thus, a characteristic of a pressing force is obtained as indicated by a fully drawn line in FIG. 2.

What is claimed is:

1. A continuously variable traction roller transmission having first and second discs, and a pair of traction rollers which come in frictional contact therewith, comprising:
   a rotation shaft;
   a ball spline arranged on said rotation shaft for supporting the first disc, said ball spline having one end face;
   a loading nut secured to said rotation shaft, said loading nut having one end portion which abuts on said one end face of said ball spline;
   spring means for urging the first disc to the second disc, said spring means being arranged between the first disc and said loading nut so as to have a set margin of deformation; and
   a preloader arranged in series with said spring means in an axial direction of the rotation shaft, said preloader being arranged between the first disc and said spring means.

2. A continuously variable traction roller transmission as claimed in claim 1, wherein said spring means include a disc spring.

3. A continuously variable traction roller transmission as claimed in claim 1, wherein said preloader has a thickness determined in accordance with a pressure to be applied.

4. A continuously variable traction roller transmission as claimed in claim 3, wherein said preloader includes a disc plate.

5. A continuously variable traction roller transmission having first and second continuously variable transmission units, each including input and output discs and a pair of traction rollers which come in frictional contact therewith, comprising:
   a rotation shaft;
   a ball spline arranged on said rotation shaft for supporting the input disc of the second continuously variable transmission unit, said ball spline having one end face;
   a loading nut secured to said rotation shaft, said loading nut having one end portion which abuts on said one end face of said ball spline;
   spring means for urging the input disc of the second continuously variable transmission unit to the output disc thereof, said spring means being arranged between the input disc of the second continuously variable transmission unit and said loading nut so as to have a set margin of deformation; and
   a preloader arranged in series with said spring means, said preloader being arranged between the input disc of the second continuously variable transmission unit and said spring means.

6. A continuously variable traction roller transmission as claimed in claim 5, wherein said spring means include a disc spring.

7. A continuously variable traction roller transmission as claimed in claim 5, wherein said preloader has a thickness determined in accordance with a pressure to be applied.

8. A continuously variable traction roller transmission as claimed in claim 7, wherein said preloader includes a disc plate.

* * * * *